(12) United States Patent
Golden et al.

(10) Patent No.: US 6,834,260 B2
(45) Date of Patent: Dec. 21, 2004

(54) INTERFERENCE REDUCTION BY STEP FUNCTION REMOVAL

(75) Inventors: Stuart A. Golden, San Diego, CA (US); Naiel K. Askar, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 10/040,602

(22) Filed: Dec. 28, 2001

(65) Prior Publication Data

US 2003/0125912 A1 Jul. 3, 2003

(51) Int. Cl.[7] .............................................. H04B 15/00
(52) U.S. Cl. ........................................ 702/191; 702/17
(58) Field of Search .................................. 702/191, 17

(56) References Cited

U.S. PATENT DOCUMENTS

| | | | | | |
|---|---|---|---|---|---|
| 3,716,849 | A | * | 2/1973 | Metcalf | 341/158 |
| 6,185,716 | B1 | * | 2/2001 | Riggle | 714/769 |
| 6,336,050 | B1 | * | 1/2002 | Amin et al. | 700/28 |
| 6,556,621 | B1 | * | 4/2003 | Richards et al. | 375/150 |
| 6,584,147 | B1 | * | 6/2003 | Schaumont et al. | 375/220 |
| 6,678,339 | B1 | * | 1/2004 | Lashkarian | 375/341 |
| 2001/0011019 | A1 | * | 8/2001 | Jokimies | 455/449 |
| 2002/0061081 | A1 | * | 5/2002 | Richards et al. | 375/346 |
| 2002/0196845 | A1 | * | 12/2002 | Richards et al. | 375/239 |
| 2002/0197975 | A1 | * | 12/2002 | Chen | 455/324 |
| 2003/0109241 | A1 | * | 6/2003 | Kim | 455/324 |

OTHER PUBLICATIONS

Bjorn A. Bjerke et al., "*A Comparison of GSM Receivers for Fading Multipath Channels with Adjacent– and Co–Channel Interference*", IEEE Journal on Selected Areas in Communications, vol. 18, No. 11, Nov. 2000, pp. 2211–2219.

* cited by examiner

Primary Examiner—Marc S. Hoff
Assistant Examiner—Anthony Gutierrez
(74) Attorney, Agent, or Firm—Fish & Richardson P.C.

(57) ABSTRACT

Correcting a signal offset may include observing a finite duration signal $y_n$ that comprises a representation of a mixture of a desired signal that may include data of interest, and an undesired signal based on interference of an external interference source. The undesired signal may include an offset component which may be modeled as comprising a step function u defined by unknown step function parameters. The unknown step function parameters may be estimated using, for example, a maximum likelihood method. Thereafter, $y_n$ may be corrected based on the estimated step function parameters.

43 Claims, 5 Drawing Sheets

INTERFERENCE REDUCTION BY STEP FUNCTION REMOVAL

TECHNICAL FIELD

This invention relates to reception of a signal.

BACKGROUND

A received signal may include a desired signal from a desired source along with one or more undesired signals, such as, for example, a noise signal (e.g., additive noise such as white Gaussian noise) from a noise source, and/or an interfering signal from an interfering source (e.g., main-lobe or side-lobe energy of the interfering signal). The received signal also may include an offset component such as, for example, a DC (direct current) offset component, that may be undesirable. The offset component is an additional additive term and may be a constant offset such as, for example, a DC offset, or may be a non-constant offset such as, for example, a step function.

To extract the desired signal from the received signal, characteristic parameters (e.g., data bits, frequency offset, DC offset) that model the received signal may be estimated. It may be desirable to perform preprocessing of the received signal prior to estimating the characteristic parameters, such as, for example, estimating the offset and removing its effect. For example, the offset may be estimated as a mean of the received signal and the mean may then be subtracted from the received signal.

The offset of the received signal may vary, for example, because of variation in the interfering signal. Such variations may cause the mean of the received signal to provide a poor estimate of the signal offset. Subtracting a poor estimate of the offset would then bias the estimates of the characteristic parameters and lead to inaccurate results.

DESCRIPTION OF DRAWINGS

Like reference symbols in the various drawings indicate like elements.

DETAILED DESCRIPTION

For illustrative purposes, a process is described for interference reduction by offset correcting a signal, where the offset may be modeled as including a step function and the signal is corrected by removing the undesired step function. For clarity of exposition, the description generally proceeds from an account of general elements and their high level Air relationship to a detailed account of illustrative roles, configurations, and components of the elements.

Figure 1:
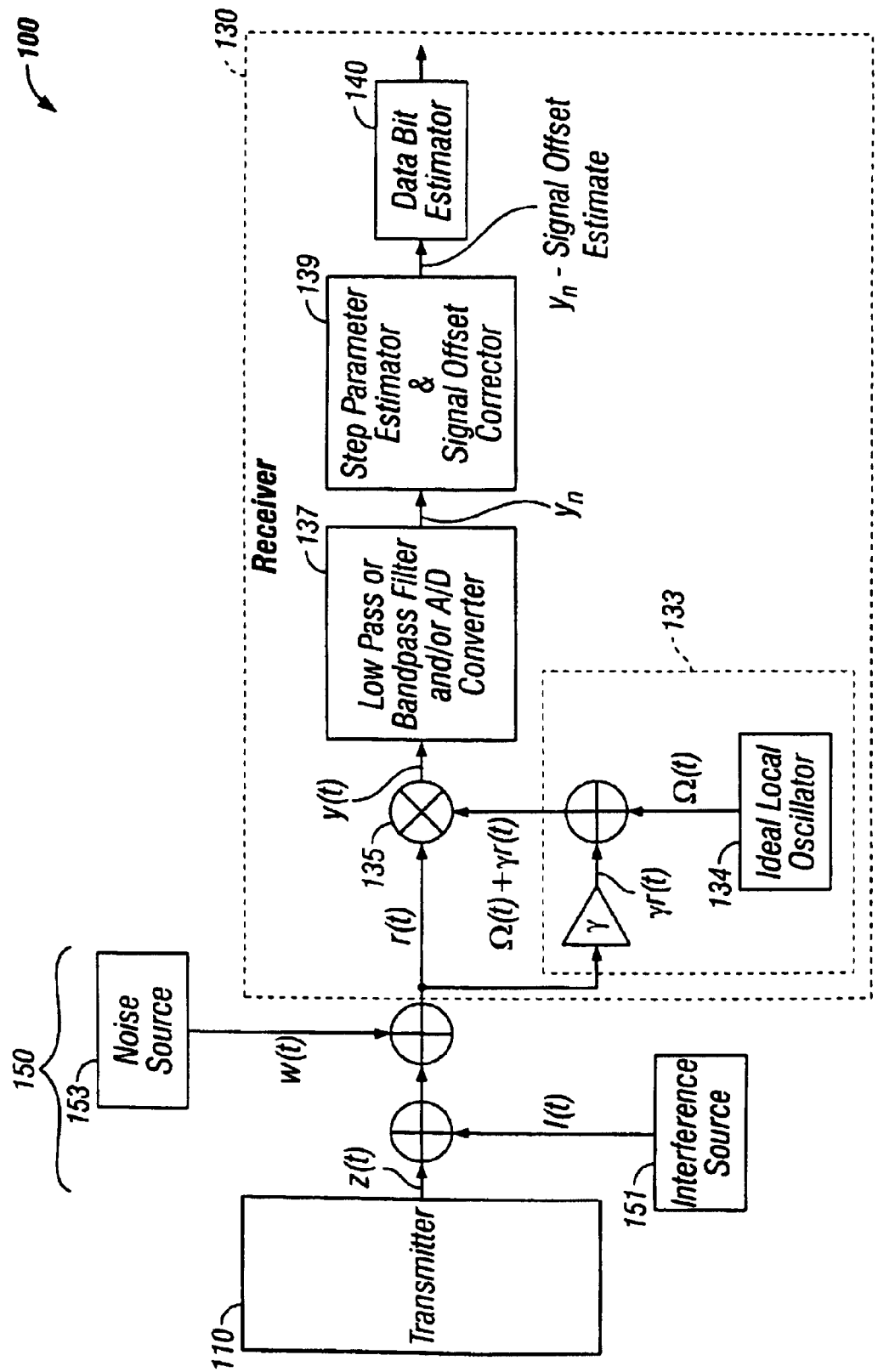
FIG. 1 is a schematic diagram of a communication system configured to estimate and correct a signal having an offset that may be modeled as a step function.

Referring to FIG. 1, a generalized system 100 (e.g., a global system for mobile communications (GSM), a time-division, multiple-access (TDMA) system, or a frequency-division, multiple access (FDMA) system) may be used to receive a transmitted signal and to correct the offset of the received signal, where the signal offset may be modeled as including a step function. Exemplary components of the system 100 are described in greater detail below.

The system 100 of FIG. 1 generally includes a transmitter 110, a receiver 130 (e.g., a superheterodyne receiver, a dual-conversion superheterodyne receiver, or a direct conversion receiver), and a channel 150 that models how the environment has changed the transmitted signal as perceived at the input port of the receiver.

In general, the transmitter 110 and the receiver 130 may include any devices, systems, pieces of code, and/or combinations of these that may be used to transmit or receive, respectively, a waveform z(t) that generally may be represented as $$z(t)=Re\{s(t)\}\cos(\omega_0 t)-Im\{s(t)\}\sin(\omega_0 t). \quad (1.0)$$

In equation (1.0), s(t) may denote a complex signal, $\omega_0=2\pi f_0$ may be an associated carrier frequency, and $Re\{s(t)\}$ and $Im\{s(t)\}$ denote respectively, real and imaginary parts of s(t).

A transmitter (e.g., transmitter 110) and/or a receiver (e.g., receiver 130) generally may include, for example, a mixer (e.g., mixer 135), a summer, a phase locked loop, a frequency synthesizer, a filter (e.g., filter 137), an oscillator (e.g., local oscillator 133), a frequency divider, a phase modulator, a down converter, an amplifier, a phase shifter, an analog-to-digital (A/D) converter or a digital-to-analog (D/A) converter (e.g., A/D converter 137), a microprocessor (MPU), a digital signal processor (DSP), a computer, or a signal processing circuit, whether linear or nonlinear, analog or digital, and/or any combination of these elements.

More specifically, receiver 130 may include a down-converter for down-converting an input signal from radio frequency (RF) to baseband. The down-converter includes the local oscillator 133, the mixer 135, and the filter 137 (e.g., an infinite impulse response filter, a finite impulse response filter). The receiver 130 also may include an A/D converter to generate a discrete signal from a continuous input and, for performing step parameter estimation and offset correction, any device, system, or piece of code suitable for that task, such as, for example, step parameter estimator and signal offset corrector 139. The step parameter estimator and signal offset corrector 139 may include, for example, a microprocessor control unit (MCU), a digital signal processing (DSP) component, a computer, a piece of code, a signal processing circuit, whether linear or nonlinear, analog or digital, and/or any combination of these for use in performing the step parameter estimation and/or the offset correction, including step function removal.

The transmitter 110 transmits a signal z(t) over the channel 150. The channel 150 may include any medium over which a signal may be communicated, such as, for example, an RF (radio frequency) portion of the electromagnetic spectrum, and or any other portion of the electromagnetic spectrum. Associated with the channel are an interference source 151 that generates an interference signal I(t) and a noise source 153 that generates a noise signal w(t). The noise source 153 and the interference source 151 add noise w(t) and interference I(t), respectively, to z(t) to form a signal r(t) received by the receiver.

The noise w(t) may include, for example, additive white Gaussian noise that may have a zero or non-zero mean, while the interfering signal I(t) may have very different characteristics before and after an event that occurs within the burst. For example, if the interfering source is due to a different TDMA user who is transmitting at the same frequency as, but not time aligned with, the desired user, then the interference may appear as being turned on and off during the burst for multiple bursts.

Figure 2:
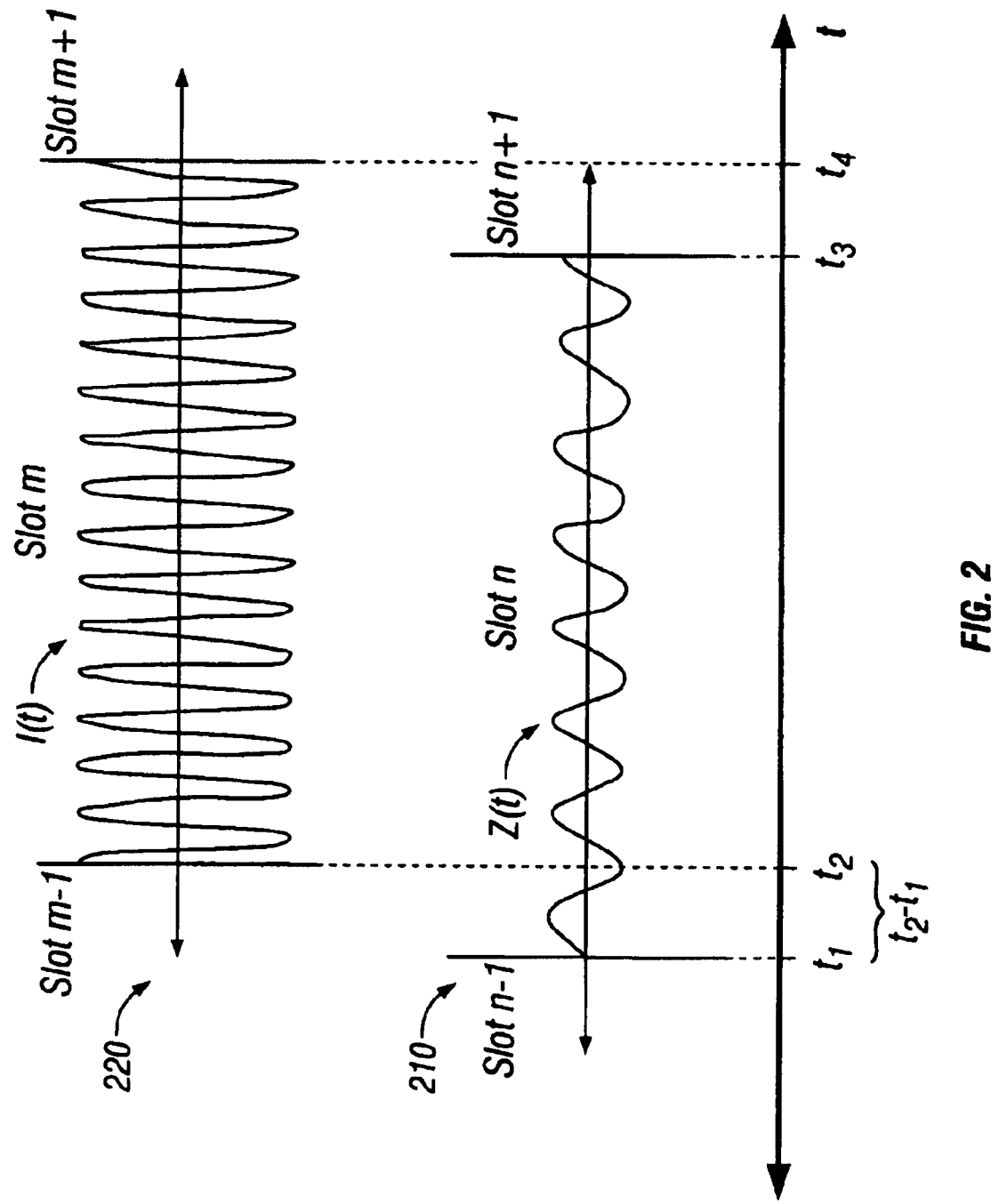
FIG. 2 is a diagram illustrating two time-division, multiple-access (TDMA) users that are not aligned in time and that may cause interference which may appear as an additional signal offset in the form of a step function.

FIG. 2 illustrates one example of burst interference that may generate a signal offset that may be represented as including a step function at the input of the data bit estimator 140. The data bit estimator 140 may include, for example, a matched filter, and/or a decoder such as, for example, a convolution decoder, and may perform functions including de-interleaving or decoding, and further may provide an estimate of data bits sent over the channel 150.

Note that the signals z(t) and I(t), as shown in FIG. 2, are illustrative only and may not represent certain characteristics of actual physical signals. As shown, signal z(t) is transmitted in time slot n of a first TDMA waveform 210, while the interference signal I(t) is transmitted in time slot m of a second TDMA waveform 220. Each TDMA waveform is associated with different TDMA channels (e.g., different GSM base stations with or without different hopping patterns).

The time slots for these first and second TDMA waveforms are not time aligned with each other (e.g., each time slot of the second TDMA waveform lags (or leads) the corresponding time slot of the first TDMA channel by the same time increment of $t_2-t_1$). The interference signal I(t) also may have a power that is much greater than that of z(t) and a center frequency different than the center frequency $\omega_0$ of z(t), such as, for example, a center frequency that approximates a harmonic of $\omega_0$.

Because of the phase difference between the two TDMA waveforms, the transmission of signal I(t) at time $t_2$ may appear as interference that is turned on and off and is included in signal z(t). Moreover, a TDMA channel structure, such as, for example, a TDMA time-slot assignment methodology, may ensure that z(t) and I(t) transmit in lockstep, causing z(t) to experience burst interference from I(t) beginning at the same relative point in each time-slot in which z(t) is transmitted (e.g., $t_2-t_1$ from the beginning of each time slot).

Referring again to FIG. 1, the receiver 130 receives from the channel a signal r(t) that includes z(t)+I(t)+w(t). A mixer 135 produces y(t) by mixing r(t) with the combination of a sinusoidal signal $\Omega(t)$ generated by local oscillator 133 with an attenuated version of r(t) that may leak into the local oscillator 133. The leakage of r(t) into the local oscillator 133 is represented by multiplying the received signal r(t) by an attenuation factor $\gamma$ to produce $\gamma r(t)$, and then summing $\gamma r(t)$ with the output $\Omega(t)$ of an ideal local oscillator 134. Leakage of r(t) into the local oscillator 133 causes y(t) to include the signal mix of $r(t)[\Omega(t)+\gamma r(t)]$.

Thereafter, y(t) passes through a low pass or band pass filter and/or an A/D (analog-to-digital) converter 137 (e.g., an integrator that performs the functions of A/D conversion and low pass filtering) to produce a discrete signal $y_n$ that may include an undesirable offset component. Thereafter, $y_n$ is processed further by step parameter estimator and offset corrector 139, which models the offset as a step function and estimates parameters descriptive of the step function. The offset of $y_n$ is corrected by offset corrector 139 based on the estimated step function parameters.

Figure 3:
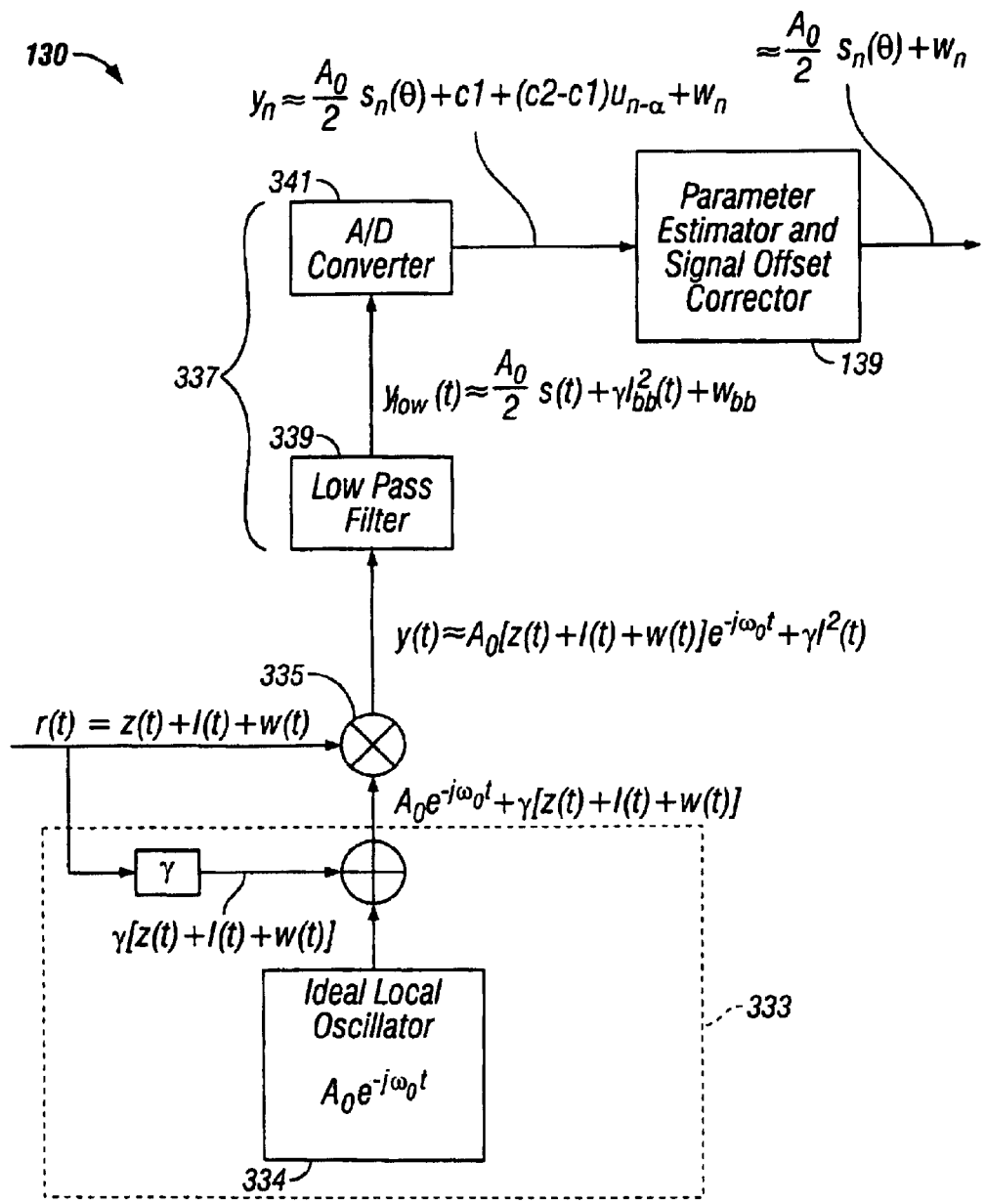
FIG. 3 is a schematic diagram of a receiver that may be used with the communication system of FIG. 1.

FIG. 3 illustrates a receiver 130 that may be used to implement the system of FIG. 1, and in which a signal r(t) leaks into an ideal local oscillator 334. The signal r(t) may include a transmitted signal z(t), a sum of interfering signals I(t), and additive white Gaussian noise signal w(t). Signal z(t) may be represented as a real signal resulting from upconversion of a complex signal s(t):

$$z(t)=Re\{s(t)\}\cos \omega_0 t - Im\{s(t)\}\sin \omega_0 t. \quad (1.1)$$

Due to the leakage of r(t) into the local oscillator 333, the mixer 335 may not simply multiply r(t) by a sinusoid (e.g., $A_0 e^{-j\omega_0 t}$, where $A_0$ is a known value). Instead r(t) is multiplied by the sinusoid and an attenuated version of the input, $\gamma r(t)$. The resulting signal may be expressed as:

$$y(t)=A_0[z(t)+I(t)+w(t)]e^{-j\omega_0 t}+$$
$$\gamma I^2(t)+\gamma z^2(t)+\gamma w^2(t)+2\gamma z(t)+I(t)+2\gamma z(t)w(t) +2\gamma w(t)I(t). \quad (1.2)$$

Substituting equation 1.1 for z(t) produces $$y(t)=A_0[Re\{s(t)\}\cos \omega_0 t-Im\{s(t)\}\sin \omega_0 t]e^{-j\omega_0 t}$$
$$+A_0 I(t)e^{-j\omega_0 t} +A_0 w(t)e^{-j\omega_0 t} +\gamma I^2(t)$$
$$+\gamma [Re\{s(t)\}\cos \omega_0 t -Im\{s(t)\}\sin \omega_0 t]^2+\gamma w^2(t)$$
$$+2\gamma[Re\{s(t)\}\cos \omega_0 t-Im\{s(t)\}\sin \omega_0 t]I(t)$$
$$+2\gamma[Re\{s(t)\}\cos \omega_0 t-Im\{s(t)\}\sin \omega_0 t]w(t)+2\gamma w(t)I(t). \quad (1.3)$$

If the attenuation term $\gamma$ is sufficiently small compared to the signal amplitude, then y(t) may be approximated as $$y(t)\approx A_0[Re\{s(t)\}\cos \omega_0 t-Im\{s(t)\}\sin \omega_0 t]e^{-j\omega_0 t}+A_0 I(t)e^{-j\omega_0 t}+$$
$$A_0 w(t)e^{-j\omega_0 t}+\gamma I^2(t), \quad (1.4)$$

in which the term $\gamma I^2(t)$ is retained because it is assumed that I(t) is of substantially greater power than z(t).

The signal y(t) then passes through a low pass filter 339, for example, to produce $y_{low}(t)$, where $y_{low}(t)$ may be approximated as:

$$y_{low}(t) \approx \frac{A_0}{2}s(t) + \gamma I_{bb}^2(t) + w_{bb}(t), \quad (1.5)$$

in which the term $A_0 I(t)e^{-j\omega_0 t}$ is assumed to be substantially removed by the low pass filter and, therefore, has been dropped. In equation (1.5), the term $w_{bb}(t)$ represents a baseband portion of $A_0 w(t)e^{-j\omega_0 t}$ that remains after passage through the low pass filter 339. Assuming I(t) to be generally sinusoidal, $\gamma I^2(t)$ may include an offset component (e.g., a DC offset) and a bandpass component at twice the center frequency of I(t). The low pass filter may substantially remove the bandpass component of $\gamma I^2(t)$ while leaving essentially unaffected the offset component, represented in equation (1.5) as $\gamma I_{bb}^2$. When for example, I(t) is switched on or off, the offset component of $\gamma I_{bb}^2$ may be modeled as a step function.

Figure 4:
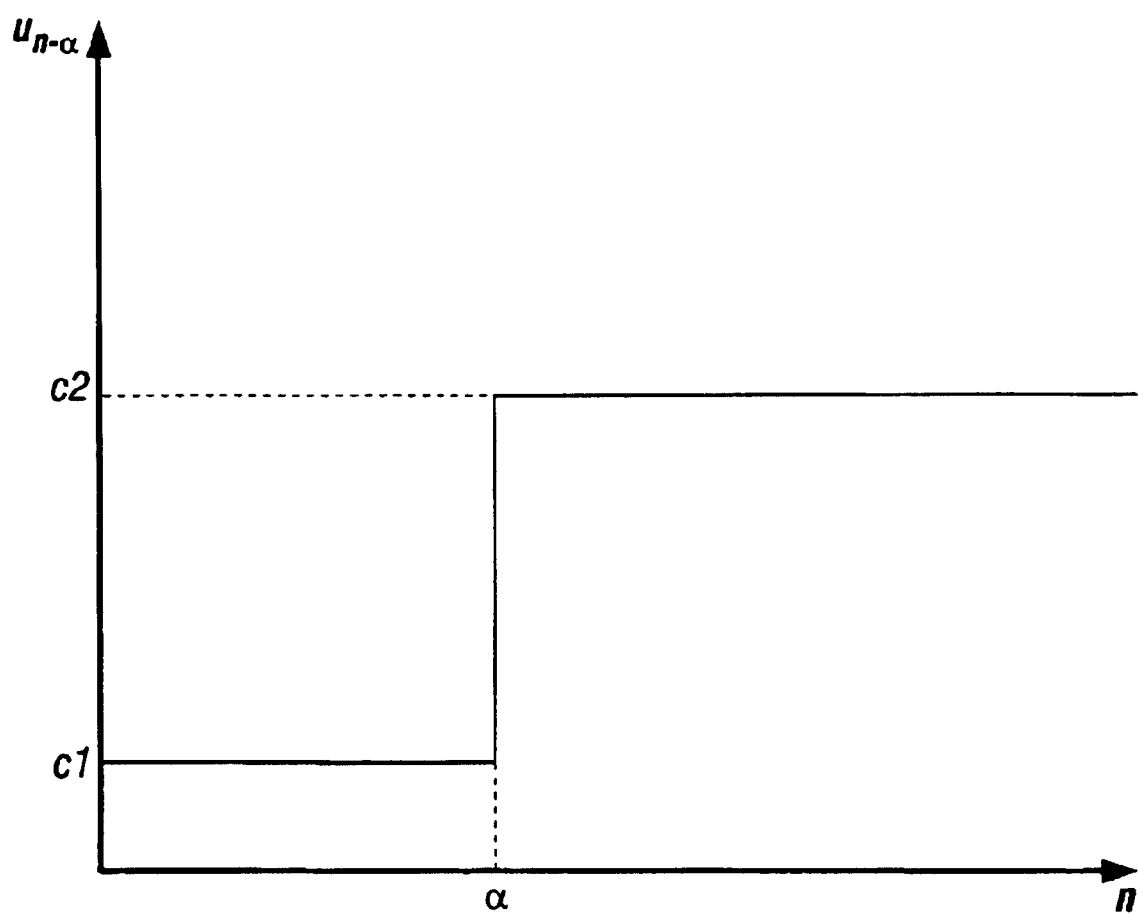
FIG. 4 is a diagram illustrating a step function that may be used to model the signal offset of the system of FIG. 1.

An A/D converter 341 may be used to generate a discrete signal $y_n$ based on the signal $y_{low}(t)$. Assuming that $\gamma I_{bb}^2$ may be represented as a step function, the discrete signal $y_n$ may be represented as:

$$y_n \approx \frac{A_0}{2}s_n(\theta) + c1 + (c2 - c1)u_{n-\alpha} + w_n \quad (1.6)$$

where $s_n(e)$ is a discrete model of the baseband signal, $\theta$ is a vector of unknown signal parameters (e.g., data bits, frequency offset), and $w_n$ is a discrete representation of zero-mean additive white Gaussian noise remaining after passing w(t) through the low pass filter 339 and the A/D converter 341. Also, referring now to FIG. 4, $u_n$ represents a unit step function that transitions from zero to one at n equals zero, such that $c1+(c2-c1)u_{n-\alpha}$ represents a step function with amplitude of c1 before the step transition and amplitude of c2 after the step transition, where the step transition occurs at time n equals $\alpha$.

Referring again to FIG. 3, the signal $y_n$ is provided to the parameter estimator and offset corrector 139. The parameters c1, c2 and $\alpha$ of the step function are estimated, and the estimated parameters then are used to correct the offset of signal $y_n$ to produce an output signal that may be represented as:

$$\frac{A_0}{2}s_n(\theta) + w_n. \tag{1.7}$$

The parameter estimator 139 may estimate the step function parameters based on, for example, gradient descent algorithms (e.g., the least-mean-square algorithm, Newton's method, the steepest descent method, and/or any combination of these methods) and/or the maximum-likelihood (ML) method.

The ML method provides a general method of maximizing the likelihood of the joint probability density function of the values of the received signal vector $(y_0, \ldots, y_{N-1})$ given an intended signal vector $(x_0, \ldots, x_{N-1})$. For the case when the observations are independent, a combined probability, or likelihood function, may be expressed as the product of the probability densities of the independent received signal vector samples, i.e., $p = p(y_0) \ldots p(y_{N-1})$, where it may be assumed that each probability density can be modeled as a Gaussian density. The likelihood function p is then maximized to find the optimal parameters using any suitable optimization technique (e.g., a non-linear optimization technique), such as, for example, the Nelder-Mead method (a method based upon the simplex algorithm), the steepest descent method, the LMS (least-mean-square) method, the Levenberg-Marquardt method (a least squares approach), the Davidson-Fletcher-Powell method (a quasi-Newton based method), or the Broyden-Fletcher-Goldfarb-Shannon method (a quasi-Newton based method), and/or any combination of one or more of these or other optimization methods.

More specifically, a ML estimate of the step function parameters c1, c2, and $\alpha$ can be obtained from the samples $y_n$ as described above. For example, we may take the baseband signal model $s_n(\theta)$ and noise model w(n) to have a zero mean, since their means can be incorporated into the step function parameters. Using $$\frac{A_0}{2}s_n(\theta) + c1 + (c2-c1)u_{n-\alpha}$$

as an expression of the mean of the individual values of the received signal vector produces the following ML likelihood function of the complex observation:

$$p = \prod_{n=0}^{N-1} \frac{1}{\sqrt{\pi}\,\sigma} e^{-|y_n - \frac{A_0}{2}s_n(\theta) + c1 + (c2-c1)u_{n-\alpha}|^2/\sigma^2}, \tag{1.8}$$

which may be simplified to $$p = \left(\frac{1}{\sqrt{\pi}\,\sigma}\right)^N e^{\frac{1}{\sigma^2}\sum_{n=0}^{N-1}|y_n - \frac{A_0}{2}s_n(\theta) + c1 + (c2-c1)u_{n-\alpha}|^2}. \tag{1.9}$$

To maximize the value of p, it is sufficient to minimize the value of $$f = \sum_{n=0}^{N-1} \left| y_n - \frac{A_0}{2}s_n(\theta) - c1 - (c2-c1)u_{n-\alpha} \right|^2, \tag{1.10}$$

which is a nonlinear least squares optimization problem. Specifically, the unknown parameters in equation (1.6) can be determined by solving $$\min_{\theta, c1, c2, \alpha} f = \sum_{n=0}^{N-1} \left| y_n - \frac{A_0}{2}s_n(\theta) - c1 - (c2-c1)u_{n-\alpha} \right|^2. \tag{1.11}$$

To determine the solution of (1.11), it is useful to partition equation (1.11) over a first interval before the transition of the square wave and a second interval after the transition of the square wave. That is, equation (1.11) becomes:

$$f = \sum_{n=0}^{\alpha-1} \left| y_n - \frac{A_0}{2}s_n(\theta) - c1 \right|^2 + \sum_{n=\alpha}^{N-1} \left| y_n - \frac{A_0}{2}s_n(\theta) - c2 \right|^2. \tag{1.12}$$

Equation (1.12) may be minimized over ($\theta$, c1, c2, $\alpha$) jointly using any of the previously mentioned optimization methods. However, since c1 and c2 are in separate terms of the objective function, their estimates also may be solved for separately. For example, the estimate for c1 may be obtained analytically by differentiating the portion of equation (1.12) that corresponds to the first interval with respect to c1, setting the result equal to zero, and solving for c1. The estimate of c2 may be solved by operating upon the portion of equation (1.12) that corresponds to the second interval in like fashion.

The estimates of c1 and c2 also may be obtained qualitatively. For example, the estimate for c1 may be expressed as a mean of an error between the observation $y_n$ and the signal prediction $s_n(\theta)$ before the square wave transitions; similarly, the estimate for c2 may be expressed as a mean of an error between the observation $y_n$ and the signal prediction $s_n(\theta)$ after the square wave transitions. Hence, the estimates $\hat{c}1$ of c1 and $\hat{c}2$ of c2 may be expressed as $$\hat{c}1 = \frac{1}{\alpha}\sum_{n=0}^{\alpha-1}\left[y_n - \frac{A_0}{2}s_n(\theta)\right] \tag{1.13}$$

and $$\hat{c}2 = \frac{1}{N-\alpha}\sum_{n=\alpha}^{N-1}\left[y_n - \frac{A_0}{2}s_n(\theta)\right]. \tag{1.14}$$

Equations (1.13) and (1.14) then may be substituted back into the objective function of equation (1.12), resulting in the following expression of the objective function:

$$f = \sum_{n=0}^{\alpha-1} \left| y_n - \frac{1}{\alpha}\sum_{m=0}^{\alpha-1} y_m - \frac{A_0}{2}s_m(\theta) + \frac{1}{\alpha}\sum_{m=0}^{\alpha-1} \frac{A_0}{2}s_m(\theta) \right|^2 + \qquad (1.15)$$

$$\sum_{n=\alpha}^{N-1} \left| y_n - \frac{1}{N-\alpha}\sum_{m=\alpha}^{N-\alpha} y_m - \frac{A_0}{2}s_n(\theta) + \right.$$

$$\left. \frac{1}{N-\alpha}\sum_{m=\alpha}^{N-\alpha} \frac{A_0}{2}s_m(\theta) \right|^2.$$

Now, equation (1.15) is a function of the observation, $y_n$, the unknown signal parameters, $\theta$, and the location of the step function, $\alpha$. All of these parameters may be jointly estimated, for example, using non-linear optimization techniques as described above.

Nevertheless, it also may be possible to estimate only the unknown parameters c1, c2 and $\alpha$ based on expanding and rearranging the terms of equation (1.15) to give $$f = \sum_{n=0}^{N-1} \left| y_n - \frac{A_0}{2}s_n(\theta) \right|^2 - g(\alpha) - \qquad (1.16)$$

$$\alpha \left| \frac{1}{\alpha}\sum_{n=0}^{\alpha} \frac{A_0}{2}s_n(\theta) \right|^2 - (N-\alpha) \left| \frac{1}{N-\alpha}\sum_{n=\alpha}^{N-\alpha} \frac{A_0}{2}s_n(\theta) \right|^2 +$$

$$2\alpha \mathrm{Re}\left[ \frac{1}{\alpha}\sum_{m=0}^{\alpha} y_m \right]^* \left[ \frac{1}{\alpha}\sum_{m=0}^{\alpha} \frac{A_0}{2}s_m(\theta) \right] +$$

$$2(N-\alpha)\mathrm{Re}\left[ \frac{1}{N-\alpha}\sum_{m=\alpha}^{N-\alpha} y_m^* \right]\left[ \frac{1}{N-\alpha}\sum_{m=\alpha}^{N-\alpha} \frac{A_0}{2}s_m(\theta) \right],$$

where $$g(\alpha) = \alpha \left| \frac{1}{\alpha}\sum_{n=0}^{\alpha} y_n \right|^2 + (N-\alpha) \left| \frac{1}{N-\alpha}\sum_{n=\alpha}^{N-\alpha} y_n \right|^2. \qquad (1.17)$$

The first term in equation (1.16) is an expression of mean square error between the observation $y_n$ and the signal prediction $$\frac{A_0}{2}s_n(\theta),$$

while the second term is explicitly provided by equation (1.17).

All of the other terms of equation (1.16) involve averages of the signal prediction $$\frac{A_0}{2}s_n(\theta)$$

and may be approximated as zero if the expectation of $s_n(\theta)$ is approximately equal to zero, for both before and after the transition of the step function. When the expectation of $s_n(\theta)$ may not be approximated as zero, the parameters may be estimated using a method that retains these terms. For example, the parameters may be estimated by starting with a seed value of $\alpha$ that may be used to determine an estimate of $\theta$, which, in turn, may be used to produce an estimate of $\alpha$. The method may be iterative and may continue to alternate between estimating $\alpha$ and $\theta$ until convergence to a desired degree of precision is achieved.

Nevertheless, for many signals, such as, for example, a GSM signal for which the expected value of the underlying binary data stream is zero or approximately zero, it is reasonable to assume that the average of the signal prediction $s_n(\theta)$ is equal or approximately equal to zero when taken over a sufficiently large interval. For example, the signal prediction may be expressed as:

$$s_n(\theta) = \sum_{k=0}^{L} f^k d_k h_{n-k}, \qquad (1.18)$$

where $d_k$ is an original binary data sequence with an expectation of zero, and $h_n$ is the combined action of the transmit filter, the channel filter, and the receive filter. Here the vector of unknown parameters, $\theta$, can be taken as the complete data sequence $d_k$ for all k and the complete filter $h_n$ for all n. Because the expectation of the binary sequence is zero and the binary sequence is independent of the combined filter, then the expectation of the signal in equation (1.18) is zero. That is, $$E\{d_k\}=0 \text{ implies } E\{s_n(\theta)\}=0. \qquad (1.19)$$

Hence, approximating as zero the expectation of $s_n(\theta)$, the objective function of (1.16) becomes:

$$f \approx \sum_{n=0}^{N-1} \left| y_n - \frac{A_0}{2}s_n(\theta) \right|^2 - g(\alpha), \qquad (1.20)$$

and equation (1.20) may be minimized by selecting an $\alpha$ that maximizes $g(\alpha)$. That is, $$\hat{\alpha} \approx \underset{\alpha}{\mathrm{argmax}}\, g(\alpha) = \underset{\alpha}{\mathrm{argmax}}\, \alpha \left| \frac{1}{\alpha}\sum_{n=0}^{\alpha} y_n \right|^2 + \qquad (1.21)$$

$$(N-\alpha) \left| \frac{1}{N-\alpha}\sum_{n=\alpha}^{N-\alpha} y_n \right|^2.$$

Figure 5:
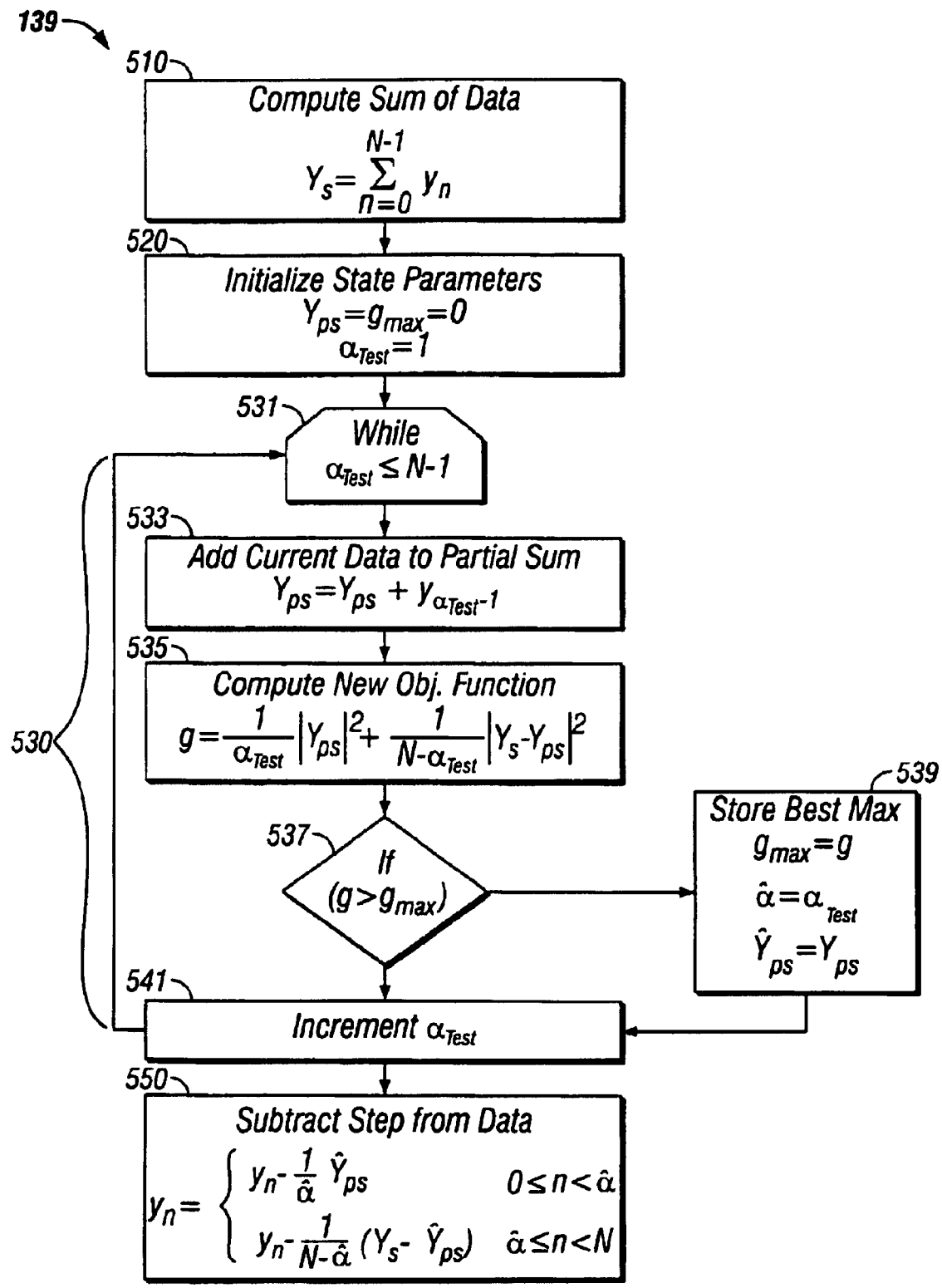
FIG. 5 is a schematic flow diagram illustrating a systematic process for offset correcting a signal having an offset that may be modeled as a step function by removing the step function of FIG. 4 from the received signal.

FIG. 5 illustrates a method 139 for optimizing equation (1.21) that may be used to implement the system of FIG. 1. A sum of the received data is computed and stored (step 510), where the sum may be expressed as:

$$Y_s = \sum_{n=0}^{N-1} y_n. \qquad (1.22)$$

Next, temporary parameters $Y_{ps}$ (a partial sum of the data) and $g_{max}$ are set initially to zero, and temporary parameter $\alpha_{Test}$ is set initially equal to one (step 520).

Using the parameters of step 520, estimates $g_{max}$, $\hat{\alpha}$, and $\hat{Y}_{ps}$ may be computed iteratively over increasing values of $\alpha_{Test}$ while $\alpha_{Test}$ is less than or equal to N-1, the number of data samples (steps 530). For example, as shown in FIG. 5, estimating $g_{max}$, $\hat{\alpha}$, and $\hat{Y}_{ps}$ may include adding the current data $Y_{\alpha_{Test-1}}$ to the partial sum of the data $Y_{ps}$ to generate an updated partial sum $Y_{ps}$ (step 533). An updated value for the object function g then may be determined as:

$$g = \frac{1}{\alpha_{Test}}|Y_{ps}|^2 + \frac{1}{N-\alpha_{Test}}|Y_s - Y_{ps}|^2 \qquad (1.23)$$

(step 535). The updated value of g then may be compared to the stored value of $g_{max}$ (step 537), and if updated g is greater than $g_{max}$, then $g_{max}$ may be set equal to updated g as a best current guess of the maximum of g, $\hat{\alpha}$ may be set equal to $\alpha_{Test}$, and $\hat{Y}_{ps}$ may be set equal to $Y_{ps}$ (step 539). After updating the values of $g_{max}$, $\hat{\alpha}$, and $\hat{Y}_{ps}$ (step 539), $\alpha_{Test}$ may be incremented (step 541) and, if $\alpha_{Test}$ is less than or equal to N-1 (step 531), then steps 530 may be repeated.

The estimation of the parameters accomplished in steps 530 also may be performed, for example, by decrementing $\alpha_{Test}$ from a high value to a low value, or by performing a random selection of $\alpha_{Test}$. Under any of the approaches mentioned, parameters may or may not be estimated for each value of $\alpha_{Test}$.

Following completion of the iterative process of steps 530, the estimated values of $g_{max}$, $\hat{\alpha}$, and $\hat{Y}_{ps}$ may be used to correct the offset of the data $y_n$ (step 550). For example, using $\hat{\alpha}$ as the estimate of the transition point of the step function, the estimate $\hat{c}1$ may be expressed using the calculated values as $$\hat{c}1 = \frac{1}{\hat{\alpha}} \hat{Y}_{ps}, \quad (1.24)$$

while $\hat{c}2$ may be expressed as $$\hat{c}2 = \frac{1}{N - \hat{\alpha}} (Y_s - \hat{Y}_{ps}). \quad (1.25)$$

Optionally, where $\hat{c}1$ and $\hat{c}2$ as estimated above are equal or approximately equal (indicating that a step function may not be present), then both may be re-estimated as $$\hat{c}1 = \hat{c}2 = \frac{1}{N}(Y_s). \quad (1.26)$$

Thereafter, to correct the offset of the received data $y_n$, the estimated parameters may be used to subtract the step function from each data point as follows $$y_n = \begin{cases} y_n - \hat{c}1, & 0 \leq n < \hat{\alpha} \\ y_n - \hat{c}2, & \hat{\alpha} \leq n < N. \end{cases} \quad (1.27)$$

Following the correction of the offset, further estimation methods may be applied to the residual data ($y_n$ minus the step function) in order to estimate the remaining unknown signal parameters $\theta$.

Other implementations are within the scope of the following claims.

What is claimed is:

1. A method comprising:
    observing a finite duration signal $y_n$ having N samples that comprises a representation of a mixture of a desired signal and an undesired signal, in which the desired signal is a function of at least one unknown signal parameter $\theta$ and the undesired signal comprises an offset component based on interference of an external interference source;
    modeling the offset component of the undesired signal as comprising a step function u defined by unknown step function parameters that include a first parameter c1 indicative of a first amplitude of the step function, a second parameter c2 indicative of a second amplitude of the step function, and a third parameter $\alpha$ indicative of a point at which the step function transitions from the first amplitude to the second amplitude;
    estimating jointly the unknown signal parameter $\theta$ and the unknown step function parameters c1, c2, and $\alpha$ ($0 \leq \alpha < N$) based on a non-linear optimization method; and
    adjusting $y_n$ based on the estimated step function parameters.

2. A system comprising:
    an observation circuit structured and arranged to observe a finite duration signal $y_n$ having N samples that comprises a discrete representation of a mixture of a desired signal and an undesired signal, in which the desired signal is a function of at least one unknown signal parameter $\theta$ and the undesired signal comprises an offset component based on interference of an external interference source;
    a modeling circuit structured and arranged to model the offset component of the undesired signal as comprising a step function u defined by unknown step function parameters that include a first parameter c1 indicative of a first amplitude of the step function, a second parameter c2 indicative of a second amplitude of the step function, and a third parameter $\alpha$ indicative of a point at which the step function transitions from the first amplitude to the second amplitude;
    an estimating circuit structured and arranged to use a non-linear optimization method to determine jointly an estimated signal parameter and estimated step function parameters representative of the unknown signal parameter $\theta$ and the unknown step function parameters c1, c2, and $\alpha$ ($0 \leq \alpha < N$); and
    a correction circuit structured and arranged to correct $y_n$ based on the estimated step function parameters.

3. A computer program stored on a computer readable medium or a propagated signal, the computer program comprising:
    an observation code segment configured to cause a computer to observe a finite duration signal $y_n$ having N samples that comprises a representation of a mixture of a desired signal and an undesired signal, in which the desired signal is a function of at least one unknown signal parameter $\theta$ and the undesired signal comprises an offset component based on interference of an external interference source;
    a modeling code segment configured to cause the computer to model the offset component of the undesired signal as comprising a step function u defined by unknown step function parameters that include a first parameter c1 indicative of a first amplitude of the step function, a second parameter c2 indicative of a second amplitude of the step function, and a third parameter $\alpha$ indicative of a point at which the step function transitions from the first amplitude to the second amplitude;
    an estimating code segment configured to cause the computer to use a non-linear optimization method to determine jointly an estimated signal parameter and estimated step function parameters representative of the unknown signal parameter $\theta$ and the unknown step function parameters c1, c2, and $\alpha$ ($0 \leq \alpha < N$); and
    a correcting code segment configured to cause the computer to correct $y_n$ based on the estimated step function parameters.

4. A processor which:
    observes a finite duration signal $y_n$ having N samples that comprises a representation of a mixture of a desired signal and an undesired signal, the undesired signal comprising an offset component based on interference of an external interference source;
    models the offset component of the undesired signal as a step function u defined by unknown step function parameters that include a first parameter c1 indicative of a first amplitude of the step function, a second parameter c2 indicative of a second amplitude of the step function, and a third parameter $\alpha$ ($0 \leq \alpha < N$) indicative of a point at which the step function transitions from the first amplitude to the second amplitude;

determines estimated step function parameters comprising:

a first estimate $\hat{c}1$ of c1 where $$\hat{c}1 \approx \frac{1}{\hat{\alpha}} \sum_{n=0}^{\hat{\alpha}-1} y_n;$$

a second estimate $\hat{c}2$ of c2 where $$\hat{c}2 \approx \frac{1}{N-\hat{\alpha}} \sum_{n=\hat{\alpha}}^{N-1} y_n; \text{ and}$$

a third estimate $\hat{\alpha}$ of $\alpha$ where $$\hat{\alpha} \approx \underset{\alpha_{Test}}{\operatorname{argmax}} \frac{1}{\alpha_{Test}} \left| \sum_{n=0}^{\alpha_{Test}-1} y_n \right|^2 + \frac{1}{N-\alpha_{Test}} \left| \sum_{n=\alpha_{Test}}^{N-1} y_n \right|^2; \text{ and}$$

corrects the signal $y_n$ based on the estimated step function parameters.

5. A method comprising:

observing a finite duration signal $y_n$ that comprises a discrete representation, including N samples, of a mixture of a desired signal, an undesired signal comprising an offset component, and a second signal including a generally sinusoidal waveform and an attenuated version of the desired signal;

modeling $y_n$ as including a discrete representation of the desired signal and a discrete representation of an offset component related to a square of the undesired signal, in which the offset component is modeled as comprising a step function u defined by unknown step function parameters;

estimating the unknown step function parameters; and adjusting $y_n$ based on the estimated step function parameters.

6. The method of claim 5 in which $y_n$ is based on a continuous signal.

7. The method of claim 5 in which $y_n$ is based on a discrete signal.

8. The method of claim 5 in which the step function parameters include a first parameter c1 indicative of a first amplitude of the step function, a second parameter c2 indicative of a second amplitude of the step function, and a third parameter $\alpha$ indicative of a point at which the step function transitions from the first amplitude to the second amplitude, and in which the desired signal is a function of at least one unknown signal parameter $\theta$.

9. The method of claim 8 in which estimating the step function parameters includes jointly estimating $\theta$, c1, c2, and $\alpha$ ($0 \leq \alpha < N$) based on a non-linear optimization method.

10. The method of claim 8 in which estimating the step function parameters includes estimating c1, c2, and $\alpha$ ($0 \leq \alpha < N$) based on a maximum likelihood method.

11. The method of claim 10 in which the estimates of the step function parameters comprise:

a first estimate $\hat{c}1$ of c1 where $$\hat{c}1 \approx \frac{1}{\hat{\alpha}} \sum_{n=0}^{\hat{\alpha}-1} y_n;$$

a second estimate $\hat{c}2$ of c2 where $$\hat{c}2 \approx \frac{1}{N-\hat{\alpha}} \sum_{n=\hat{\alpha}}^{N-1} y_n; \text{ and}$$

a third estimate $\hat{\alpha}$ of $\alpha$ where $$\hat{\alpha} \approx \underset{\alpha_{Test}}{\operatorname{argmax}} \frac{1}{\alpha_{Test}} \left| \sum_{n=0}^{\alpha_{Test}-1} y_n \right|^2 + \frac{1}{N-\alpha_{Test}} \left| \sum_{n=\alpha_{Test}}^{N-1} y_n \right|^2, 0 \leq \alpha_{Test} < N-1.$$

12. The method of claim 11 in which determining $\hat{\alpha}$ comprises:

selecting more than one value of $\alpha_{Test}$;

determining a value g for each selected value of $\alpha_{Test}$ where $$g \approx \frac{1}{\alpha_{Test}} \left| \sum_{n=0}^{\alpha_{Test}-1} y_n \right|^2 + \frac{1}{N-\alpha_{Test}} \left| \sum_{n=\alpha_{Test}}^{N-1} y_n \right|^2;$$

selecting from among the determined values of g one or more maximum values of g; and selecting $\hat{\alpha}$ based on the one or more maximum values of g.

13. The method of claim 12 in which less than N values of $\alpha_{Test}$ are selected.

14. The method of claim 10 in which estimating the step function parameters further comprises jointly estimating $\theta$, c1, c2, and $\alpha$ based on a non-linear minimization of a function comprising $$f(\theta, c1, c2, \alpha) \approx \sum_{n=0}^{\alpha-1} \left| y_n - \frac{1}{\alpha}\sum_{m=0}^{\alpha-1} y_m - \frac{A_0}{2}s_m(\theta) + \frac{1}{\alpha}\sum_{m=0}^{\alpha-1}\frac{A_0}{2}s_m(\theta) \right|^2 +$$

$$\sum_{n=\alpha}^{N-1} \left| y_n - \frac{1}{N-\alpha}\sum_{m=\alpha}^{N-\alpha} y_m - \frac{A_0}{2}s_n(\theta) + \frac{1}{N-\alpha}\sum_{m=\alpha}^{N-\alpha}\frac{A_0}{2}s_m(\theta) \right|^2$$

in which the minimization is performed by computing one or more of the derivatives of $f$.

15. The method of claim 5 wherein the desired signal comprises data of interest.

16. A system comprising:

an observation circuit structured and arranged to observe a finite duration signal $y_n$ that comprises a discrete representation, including N samples, of a mixture of a desired signal, an undesired signal comprising an offset component, and a second signal including a generally sinusoidal waveform and an attenuated version of the desired signal;

a modeling circuit structured and arranged to model $y_n$ as including a discrete representation of the desired signal and a discrete representation of an offset component related to a square of the undesired signal, in which the offset component is modeled as comprising a step function u defined by unknown step function parameters;

an estimating circuit structured and arranged to determine estimated step function parameters representative of the unknown step function parameters; and a correction circuit structured and arranged to correct $y_n$ based on the estimated step function parameters.

17. The system of claim 16 in which $y_n$ is based on a continuous signal.

18. The system of claim 16 in which $y_n$ is based on a discrete signal.

19. The system of claim 16 in which the unknown step function parameters include a first parameter c1 indicative of a first amplitude of the step function, a second parameter c2 indicative of a second amplitude of the step function, and a third parameter $\alpha$ indicative of a point at which the step function transitions from the first amplitude to the second amplitude, and in which the desired signal is a function of at least one unknown signal parameter $\theta$.

20. The system of claim 19 in which the estimating circuit is further configured to estimate jointly the unknown step function parameters $\theta$, c1, c2, and $\alpha$ ($0 \leq \alpha < N$) based on a non-linear optimization method.

21. The system of claim 19 in which the estimating circuit is further configured to estimate the unknown step function parameters c1, c2, and $\alpha$ ($0 \leq \alpha < N$) based on a maximum likelihood method.

22. The system of claim 21 in which the estimating circuit is further configured to estimate the unknown step function parameters as comprising:

a first estimate $\hat{c}1$, of c1 where $$\hat{c}1 \approx \frac{1}{\hat{\alpha}} \sum_{n=0}^{\hat{\alpha}-1} y_n;$$

a second estimate $\hat{c}2$ of c2 where $$\hat{c}2 \approx \frac{1}{N-\hat{\alpha}} \sum_{n=\hat{\alpha}}^{N-1} y_n; \text{ and}$$

a third estimate $\hat{\alpha}$ of $\alpha$ where $$\hat{\alpha} \approx \underset{\alpha_{Test}}{\mathrm{argmax}} \frac{1}{\alpha_{Test}} \left| \sum_{n=0}^{\alpha_{Test}-1} y_n \right|^2 + \frac{1}{N-\alpha_{Test}} \left| \sum_{n=\alpha_{Test}}^{N-1} y_n \right|^2, 0 \leq \alpha_{Test} < N.$$

23. The system of claim 22 in which the estimating circuit is further configured to determine $\hat{\alpha}$ based on the following:

selecting more than one value of $\alpha_{Test}$;

determining a value g for each selected value of $\alpha_{Test}$ where $$g \approx \frac{1}{\alpha_{Test}} \left| \sum_{n=0}^{\alpha_{Test}-1} y_n \right|^2 + \frac{1}{N-\alpha_{Test}} \left| \sum_{n=\alpha_{Test}}^{N-1} y_n \right|^2;$$

selecting from among the determined values of g one or more maximum values of g; and selecting $\hat{\alpha}$ based on the one or more maximum values of g.

24. The system of claim 23 in which less than N values of $\alpha_{Test}$ are selected by the estimating circuit.

25. The system of claim 21 in which the estimating circuit is further configured to estimate jointly the unknown step function parameters $\theta$, c1, c2, and $\alpha$ based on non-linear minimization of a function comprising $$f(\theta, c1, c2, \alpha) \approx \sum_{n=0}^{\alpha-1} \left| y_n - \frac{1}{\alpha}\sum_{m=0}^{\alpha-1} y_m - \frac{A_0}{2}s_m(\theta) + \frac{1}{\alpha}\sum_{m=0}^{\alpha-1} \frac{A_0}{2}s_m(\theta) \right|^2 +$$

$$\sum_{n=\alpha}^{N-1} \left| y_n - \frac{1}{N-\alpha}\sum_{m=\alpha}^{N-\alpha} y_m - \frac{A_0}{2}s_n(\theta) + \frac{1}{N-\alpha}\sum_{m=\alpha}^{N-\alpha} \frac{A_0}{2}s_m(\theta) \right|^2$$

in which minimization is performed by computing one or more of the derivatives of $f$.

26. The system of claim 16 wherein the desired signal comprises data of interest.

27. A computer program stored on a computer readable medium or a propagated signal, the computer program comprising:

an observation code segment configured to cause a computer to observe a finite duration signal $y_n$ that comprises a discrete representation, including N samples, of a mixture of a desired signal, an undesired signal comprising an offset component, and a second signal including a generally sinusoidal waveform and an attenuated version of the desired signal;

a modeling code segment configured to cause the computer to model $y_n$ as including a discrete representation of the desired signal and a discrete representation of an offset component related to a square of the undesired signal, in which the offset component is modeled as comprising a step function u defined by unknown step function parameters;

an estimating code segment configured to cause the computer to determine estimated step function parameters representative of the unknown step function parameters; and a correcting code segment configured to cause the computer to correct $y_n$ based on the estimated step function parameters.

28. The computer program of claim 27 in which $y_n$ is based on a continuous signal.

29. The computer program of claim 27 in which $y_n$ comprises is based on a discrete signal.

30. The computer program of claim 27 in which the unknown step function parameters include a first parameter c1 indicative of a first amplitude of the step function, a second parameter c2 indicative of a second amplitude of the step function, and a third parameter $\alpha$ indicative of a point at which the step function transitions from the first amplitude to the second amplitude, and in which the desired signal is a function of at least one unknown signal parameter $\theta$.

31. The computer program of claim 30 in which the estimating code segment further comprises a non-linear optimization code segment configured to cause the computer program to estimate jointly the unknown step function parameters $\theta$, c1, c2, and $\alpha$ ($0 \leq \alpha < N$) based on a non-linear optimization method.

32. The computer program of claim 30 in which the estimating code segment further comprises a maximum likelihood code segment configured to cause the computer to estimate the unknown step function parameters c1, c2, and $\alpha$ ($0 \leq \alpha < N$) based on a maximum likelihood method.

33. The computer program of claim 32 in which the maximum likelihood code segment is further configured to cause the computer to estimate the unknown step function parameters as comprising:

a first estimate $\hat{c}1$ of c1 where $$\hat{c}1 \approx \frac{1}{\hat{\alpha}} \sum_{n=0}^{\hat{\alpha}-1} y_n;$$

a second estimate $\hat{c}2$ of c2 where $$\hat{c}2 \approx \frac{1}{N-\hat{\alpha}} \sum_{n=\hat{\alpha}}^{N-1} y_n; \text{ and}$$

a third estimate $\hat{\alpha}$ of $\alpha$ where $$\hat{\alpha} \approx \operatorname*{argmax}_{\alpha_{Test}} \frac{1}{\alpha_{Test}} \left| \sum_{n=0}^{\alpha_{Test}-1} y_n \right|^2 + \frac{1}{N-\alpha_{Test}} \left| \sum_{n=\alpha_{Test}}^{N-1} y_n \right|^2, 0 \leq \alpha_{Test} < N.$$

34. The computer program of claim 33 in which the maximum likelihood code segment further comprises:
a selecting code segment configured to cause the computer to select more than one value of $\alpha_{Test}$;
a calculating code segment configured to cause the computer to determine a value g for each selected value of $\alpha_{Test}$ where $$g \approx \frac{1}{\alpha_{Test}} \left| \sum_{n=0}^{\alpha_{Test}-1} y_n \right|^2 + \frac{1}{N-\alpha_{Test}} \left| \sum_{n=\alpha_{Test}}^{N-1} y_n \right|^2;$$

a g_max code segment configured to cause the computer to select from among the determined values of g one or more maximum values of g; and
an $\hat{\alpha}$_max code segment configured to cause the computer to select $\hat{\alpha}$ based on the one or more maximum values of g.

35. The computer program of claim 34 in which the selecting code segment is further configured to cause the computer to select less than N values of $\alpha_{Test}$.

36. The computer program of claim 32 in which the maximum likelihood code segment is further configured to cause the computer to estimate jointly the unknown step function parameters $\theta$, c1, c2, and $\alpha$ based on non-linear minimization of a function comprising $$f(\theta, c1, c2, \alpha) \approx \sum_{n=0}^{\alpha-1} \left| y_n - \frac{1}{\alpha} \sum_{m=0}^{\alpha-1} y_m - \frac{A_0}{2} s_m(\theta) + \frac{1}{\alpha} \sum_{m=0}^{\alpha-1} \frac{A_0}{2} s_m(\theta) \right|^2 +$$

$$\sum_{n=\alpha}^{N-1} \left| y_n - \frac{1}{N-\alpha} \sum_{m=\alpha}^{N-\alpha} y_m - \frac{A_0}{2} s_n(\theta) + \frac{1}{N-\alpha} \sum_{m=\alpha}^{N-\alpha} \frac{A_0}{2} s_m(\theta) \right|^2$$

in which the minimization is performed by computing one or more of the derivatives of $f$.

37. The computer program of claim 27 wherein the desired signal comprises data of interest.

38. A processor which:
observes a finite duration signal $y_n$ that comprises a discrete representation, including N samples, of a mixture of a desired signal, an undesired signal comprising an offset component, and a second signal including a generally sinusoidal waveform and an attenuated version of the desired signal;
models $y_n$ as including a discrete representation of the desired signal and a discrete representation of an offset component related to a square of the undesired signal, in which the offset component is modeled as comprising a step function u defined by unknown step function parameters;
determines estimated step function parameters; and
corrects the signal $y_n$ based on the estimated step function parameters.

39. The processor of claim 38 in which $y_n$ is based on a continuous signal.

40. The processor of claim 38 in which $y_n$ is based on a discrete signal.

41. The processor of claim 38 in which the unknown step function parameters include a first parameter c1 indicative of a first amplitude of the step function, a second parameter c2 indicative of a second amplitude of the step function, and a third parameter $\alpha$ ($0 \leq \alpha < N$) indicative of a point at which the step function transitions from the first amplitude to the second amplitude.

42. The processor of claim 41 in which the processor estimates the unknown step function parameters as comprising:
a first estimate $\hat{c}1$ of c1 where $$\hat{c}1 \approx \frac{1}{\hat{\alpha}} \sum_{n=0}^{\hat{\alpha}-1} y_n;$$

a second estimate $\hat{c}2$ of c2 where $$\hat{c}2 \approx \frac{1}{N-\hat{\alpha}} \sum_{n=\hat{\alpha}}^{N-1} y_n; \text{ and}$$

a third estimate $\hat{\alpha}$ of $\alpha$ where $$\hat{\alpha} \approx \operatorname*{argmax}_{\alpha_{Test}} \frac{1}{\alpha_{Test}} \left| \sum_{n=0}^{\alpha_{Test}-1} y_n \right|^2 + \frac{1}{N-\alpha_{Test}} \left| \sum_{n=\alpha_{Test}}^{N-1} y_n \right|^2.$$

43. The processor of claim 38 wherein the desired signal comprises data of interest.

* * * * *